(12) United States Patent
Petermaier et al.

(10) Patent No.: US 11,092,182 B2
(45) Date of Patent: Aug. 17, 2021

(54) DRIVE SCREW

(71) Applicant: Lisa Draexlmaier GmbH, Vilsbiburg (DE)

(72) Inventors: Johann Petermaier, Dingolfing (DE); Leonard Dobos, Kroening (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 365 days.

(21) Appl. No.: 15/839,833

(22) Filed: Dec. 12, 2017

(65) Prior Publication Data
US 2018/0163760 A1 Jun. 14, 2018

(51) Int. Cl.
| | | |
|---|---|---|
| *F16B 39/00* | (2006.01) | |
| *F16B 15/06* | (2006.01) | |
| *F16B 35/06* | (2006.01) | |
| *F16B 25/00* | (2006.01) | |

(52) U.S. Cl.
CPC .............. *F16B 15/06* (2013.01); *F16B 35/06* (2013.01); *F16B 25/0015* (2013.01); *F16B 25/0042* (2013.01)

(58) Field of Classification Search
CPC . F16B 25/0042; F16B 39/103; F16B 25/0015
USPC .... 411/166, 411, 414, 416, 377, 371.2, 396, 411/397
See application file for complete search history.

(56) References Cited

U.S. PATENT DOCUMENTS

| | | | |
|---|---|---|---|
| 748,973 A | 1/1904 | Moses | |
| 1,683,501 A * | 9/1928 | Tobeler | B21D 45/006 83/143 |
| 2,346,769 A * | 4/1944 | Lichtor | 52/508 |
| 3,461,769 A | 8/1969 | Brosseit | |
| 4,576,534 A * | 3/1986 | Barth | F16B 25/0015 411/412 |
| 4,647,263 A * | 3/1987 | Macfee, Jr. | F16B 37/048 411/174 |
| 4,900,208 A * | 2/1990 | Kaiser | E04D 3/3603 411/188 |
| 5,018,329 A * | 5/1991 | Hasan | E04D 3/3603 411/369 |
| 5,100,274 A * | 3/1992 | Hasan | E04D 3/3603 411/368 |
| 5,217,339 A * | 6/1993 | O'Connor | E04D 3/3603 411/161 |
| 5,252,016 A * | 10/1993 | Schmid | A47G 1/20 411/386 |
| 5,322,400 A * | 6/1994 | Ford | F16B 37/041 411/171 |

(Continued)

OTHER PUBLICATIONS

German Office Action dated Sep. 12, 2017, 10 pages.

*Primary Examiner* — Gary W Estremsky

(74) *Attorney, Agent, or Firm* — Jacob Eisenberg

(57) ABSTRACT

The present disclosure relates to a drive screw for connecting a carrier formed of foamed material to a part to be affixed to the carrier. In one implementation, the drive screw includes a threaded pin with a first end having shaped elements configured to connect to a tool that transfers torque and a second end configured to penetrate into the carrier. In addition, the first end of the threaded pin may be surrounded by and connected to an interlock component, and the part to be affixed may have an interlock receiving space corresponding to the interlock component.

14 Claims, 2 Drawing Sheets

(56) References Cited

U.S. PATENT DOCUMENTS

| | | | | |
|---|---|---|---|---|
| 5,486,045 A * | 1/1996 | Dasher | ............... | A47B 57/06 |
| | | | | 248/300 |
| 5,584,629 A * | 12/1996 | Bailey | ............... | A61C 8/0066 |
| | | | | 411/178 |
| 5,947,670 A * | 9/1999 | Larson | ............... | F16B 25/0031 |
| | | | | 411/387.1 |
| 6,079,179 A * | 6/2000 | Shoemaker, Jr. | ............... | E04B 1/4164 |
| | | | | 411/396 |
| 6,730,092 B2 * | 5/2004 | Songer | ............... | A61B 17/0401 |
| | | | | 606/232 |
| 7,658,581 B2 * | 2/2010 | Sußenbach | ............... | F16B 25/0015 |
| | | | | 411/411 |
| 8,197,019 B2 * | 6/2012 | Kim | ............... | F25D 23/067 |
| | | | | 312/401 |
| 9,155,580 B2 * | 10/2015 | Cormier | ............... | A61B 17/864 |
| 10,337,544 B2 * | 7/2019 | Reithmaier | ............... | F16B 25/0047 |
| 2003/0007845 A1 * | 1/2003 | Gens | ............... | F16B 25/00 |
| | | | | 411/411 |
| 2007/0059121 A1 * | 3/2007 | Chien | ............... | F16B 35/06 |
| | | | | 411/396 |

* cited by examiner

DRIVE SCREW

CROSS-REFERENCE TO RELATED APPLICATIONS

The present application claims priority to German Patent Application No. 10 2016 124 210.1, filed Dec. 13, 2016, the contents of which are incorporated herein by reference.

TECHNICAL FIELD

The present disclosure relates to a drive screw for connecting a carrier made of a foamed material to a component to be affixed to the carrier.

BACKGROUND

Plastics are used in many fields, such as the automotive industry, primarily due to their great strength and low weight. Screwed connections are often used to detachably connect plastic components. Thread-forming or thread-rolling screws are typically used. They are generally comprised of a head and a screw core in the form of an elongated cone or a pin that tapers, more or less, to a point at the tip of the screw. The screw core is often surrounded by a helical peripheral cutting edge projecting radially from the thread root, which transitions into the two flanks of the cutting thread with a more or less sharp bend. The flanks in turn are usually provided with a constant pitch from the thread root to the crest, resulting in a uniform thread angle between the two flank lines.

In addition, the need for light-weight construction in the automotive industry has resulted in an ever-growing range of applications for plastics, including increasing use of physical or chemical foams that replace plastic material with air (such as nitrogen, $CO_2$ or the like). In the case of physical foams, substances such as nitrogen, carbon dioxide or a chemical blowing agent are typically injected under pressure in a supercritical state into the molten plastic and uniformly distributed during plasticizing. After injection into the unpressurized mold, the gas generally separates from the smelt and forms a fine-celled foam structure. The marginal layers may retain their compactness on the tool wall throughout the cooling process and form a continuous outer shell. Such plastics are typically lightweight and thus lower the overall weight of the structure in which they are used.

When used in plastics, including foamed plastics, thread-rolling screws often damage the plastic into which they are driven, for example, by rupturing the tube or by inducing stress cracking.

Extant thread geometry may also lead to overdriving of the screw during assembly and to destruction of the self-formed threads in the tube intended to support the screw. Thus, there is often a risk that, in certain circumstances, the entire plastic part may become useless.

Another possibility for affixing parts on a foamed plastic is to use auxiliary means, such as welding bolts, on the vehicle shell or to use plastic bosses on cladding parts. However, these are complex processes requiring the use of tools and for which it is generally necessary to use additional means, such as washers, to axially secure the material.

SUMMARY

Therefore, embodiments of the present disclosure may allow for establishing a connection between a foamed carrier component and a part to be affixed to the carrier such that the connection may be nondestructively and simply released.

One aspect of the present disclosure describes a drive screw that connects a carrier formed of a foamed material to a part to be affixed to the carrier. The drive screw may include a threaded pin. The threaded pin may have a first end with molded elements configured to connect to a tool that transfers torque and may have a second end configured to penetrate into the carrier. The first end of the drive screw may be surrounded by an interlock element to which it is connected. To help ensure nondestructive removal of the drive screw, the part to be affixed may have an interlock receiving space corresponding to the interlock element. Accordingly, the drive screw may be press fitted into the carrier rather than screwed into the carrier. The carrier may comprise a soft foam, such as an elastic polypropylene.

The threaded pin may have a screw thread. The material of the carrier may be compressed by the screw thread, which may catch on the carrier due to the softness of the carrier. The drive screw may therefore be held in position by the screw thread.

In some embodiments, the threaded pin may have a peripheral thread with a thread pitch. The dimensioning of the pitch may depend on the degree of foaming of the carrier. For example, the pitch may increase with the degree of foaming since a higher degree of foaming generally results in easier displacement of the material of the carrier. A lower degree of foaming may require that the material of the carrier be cut rather than displaced, and thus the pitch may be smaller. In one embodiment, the carrier may have a degree of foaming ranging from 2% (e.g. foamed plastic) to 90% (e.g. Styrofoam).

In some embodiments, the screw thread may have rounded edges at least in a portion of the screw thread. In certain aspects, the screw thread may have the rounded edges at least at a distance from the tip of the drive screw. Cutting into the carrier generally signifies a weakening of the material at the cut edge. The rounded edges may keep the screw from cutting into the material. In such embodiments, the screw may be wedged into the carrier by displacement and compaction rather than by cutting.

The foamed plastic may be displaced gently, for example, when the distance between two thread turns is greater than 0.5 mm, and depending on the length and the diameter of the screw. Such displacement may allow for as little material as possible being torn apart between two thread turns.

In some embodiments, the drive screw may have one or more thread cutters shaped onto the threaded pin. For example, at least one thread cutter may be formed on the tip of the threaded pin. The thread cutter may support the thread formation during the press-fitting process. In such embodiments, the force that must be exerted for the screw to penetrate the carrier may be reduced.

The pitch of the threaded pin may vary. Varying the pitch means that the spacing between adjacent turns of the thread is not constant for the whole thread. Changing the pitch may cause the carrier to be compressed or stretched as the screw is pressed in. In such embodiments, the additional tensioning of the carrier by the drive screw may increase the strength of the connection. For example, decreasing the distance of the thread from the tip of the screw may result in greater friction and/or higher torque at the end of the press-fitting operation when the area increases due to the smaller thread distances.

In some embodiments, the drive screw may have a diameter of 4, 4.5, 5, 5.5 or up to 10 mm and may have a length of 9 to 100 mm.

In some embodiments, the ratio of the thread pitch to the outer diameter of the threaded pin may be less than 2, e.g., less than 1.

In some embodiments, the thread may have the shape of a pipe thread, a trapezoidal thread, a flat thread, a buttress thread or a round thread. Such threads have adjoining flanks that generally do not meet at an acute angle and have thread angles that may lie within a range of 0 to 60 degrees. If other thread types such as a metric thread or a Whitworth thread are used, the pitch may be greater than 0.7 mm. Smaller pitches may cause an abrasive effect that may damage the carrier as the drive screw is being press-fitted or unscrewed.

In some embodiments, a rounded out transition between the flanks and the thread root may be used such that a notch-free screw profile may be achieve. In such embodiments, stress on the plastic and/or foam of the carrier may be further reduced. The thread may include a first segment having angles between 45° and 90° at a transition between a thread root and a first flank and may include a second segment having angles between 95° and 120° at a junction between the first flank and a second flank and may further include a third segment having angles between 90° and 120° at a transition between the second flank and the thread root.

The drive screw may be press-fitted into a carrier formed of solid plastic material. To allow the drive screw to be positioned, the carrier, for example having a degree of foaming between 3% and 80%, may have a notch or a recess having a width corresponding to the diameter of the screw at its tip. Directly screwing the screw into the solid material may eliminate time-consuming and expensive constructional calculations and testing loops for designing a tube. The recess or notch may allow for easily finding the best position for setting the drive screw to initiate the press-fitting process. The recess or notch may also prevent the drive screw from slipping during positioning, which would cause it to be pressed in at a slant or an offset or otherwise incorrectly pressed in. In other embodiments, a tube or a boss may be used as an alternative to or in addition to the notch or the recess.

The interlock element may be positioned around the threaded pin and positively connected to it. The interlock element may have an internal thread that fits the threaded pin of the drive screw such that the threaded pin may be connected to the interlock element by being screwed into the same. After the drive screw has been press-fitted into the carrier, the screwed connection of the interlock element and threaded pin may allow for the possibility of disconnecting the carrier from the component to be affixed by unscrewing the threaded pin. This detachment generally occurs without destroying any of the components.

To avoid overdriving the threaded pin as it is being unscrewed, the interlock element and/or the corresponding interlock receiving space may be three-dimensionally designed such that a clamping action is generated between the interlock element and the corresponding interlock receiving space to minimize the possibility of overdriving the interlock component. Such overdriving may, for instance, occur if the interlock element were circular in shape.

The shape of the interlock element and/or the shape of the interlock receiving space may be adapted to the available installation space, to the area provided on the carrier for the attachment, and/or to the part to be affixed. The interlock element may be in the shape of a polygon, a star, a simple rib, or any other non-circular shape, i.e., not all points on the peripheral line may have the same spacing from the center. In some embodiments, a bore for the threaded pin may be provided.

The interlock element may be three-dimensional and may have a height between 2 mm and 20 mm and/or a width of at least twice the diameter of the threaded pin.

Finally, in one embodiment, the interlock element and/or the interlock receiving space may be formed of plastic, copper, aluminum, brass, steel, one or more natural materials, or an alloy. In one embodiment, the interlock element and the threaded pin may be formed of the same material.

In injection molded parts of foamed plastic, the plastic is usually destroyed when conventional screws are used, with the result that a conventional screw may completely lose its hold in the plastic layer and then only be removed with difficulty. In the screw according to the present disclosure, the interlock element may counteract the torque generated while the threaded pin is being unscrewed, thus allowing for nondestructive detachment of the component to be affixed from the carrier.

Additional advantages and features of the present disclosure, which may be implemented alone or in combination with one or more of the above features, are described in the following.

BRIEF DESCRIPTION OF THE DRAWINGS

An example embodiment of the present disclosure is explained below with reference to the accompanying drawings. The scope of the disclosure is not limited by the example embodiment depicted in the drawings.

In the drawings.

DETAILED DESCRIPTION

Figure 1:
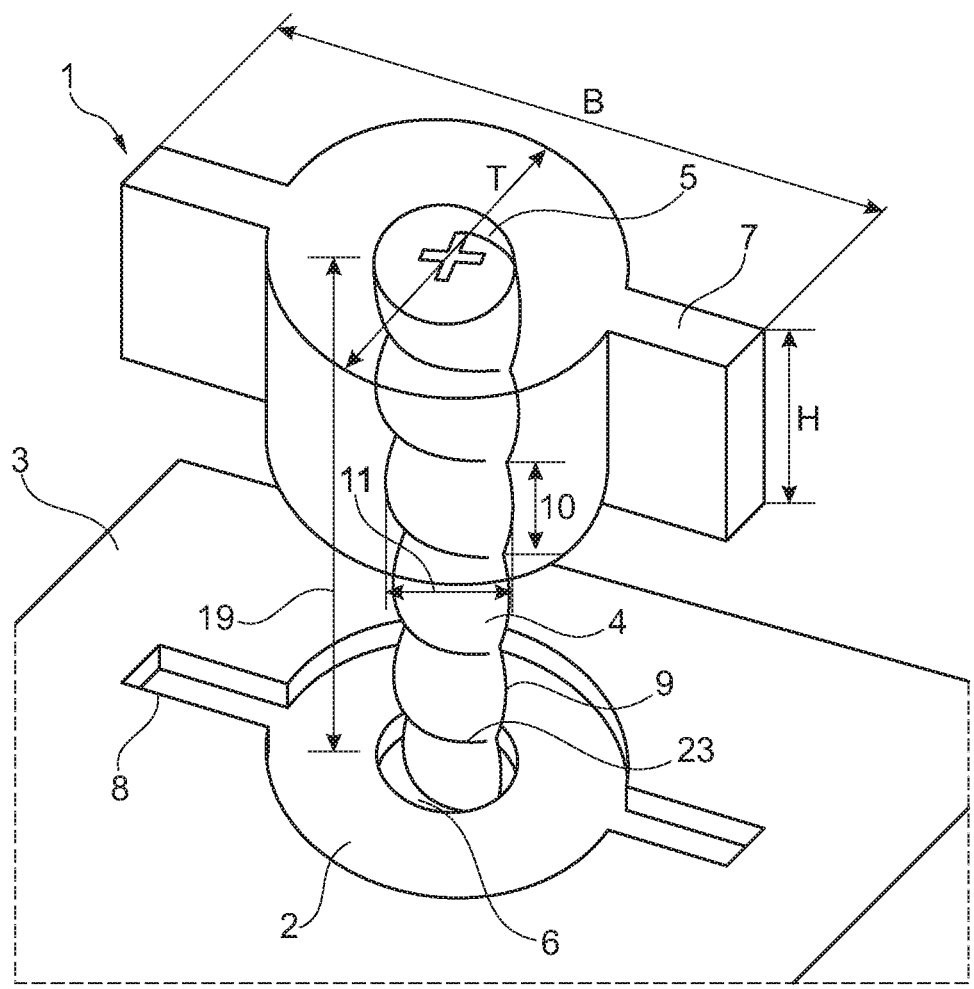
FIG. 1 shows a drive screw according to an example embodiment of the present disclosure.

FIG. 1 shows a drive screw 1 with a threaded pin 4 according to an embodiment of the present disclosure. As depicted in FIG. 1, the threaded pin 4 has a first end 5 and a second end 6. The first end 5 has shaped elements for positive connection to a tool. The shaped elements, such as a hexagon, slotted, Phillips, torx head, or the like, serve to transfer torque from the tool to threaded pin 4. The second end 6 has a threaded pin tip (not shown). In some embodiments, the threaded pin tip may also be blunt or designed with a molded-on thread cutter.

A helical screw thread 9 runs around the threaded pin 4. The edges 23 of the screw thread 9 are rounded, or alternatively blunt-edged, such that no cuts are made into the material of the carrier 2 during press-fitting and unscrewing.

The thread spacing 10, i.e., the distance between two adjacent turns of the screw thread 9, yields the pitch. The screw thread 9 has an outer diameter 11. The quotient of the pitch 10 and the outer diameter 11 of the screw thread 9 may be smaller than that of conventional plastic screws.

The threaded pin 4 is surrounded at its first end 5 by a three-dimensional interlock component 7. A screw mechanism may be used to connect the interlock component 7 and the threaded pin 4. The interlock component 7 may have an internal thread (not shown) corresponding to the screw thread 9 of the threaded pin 4. The threaded pin 4 may be driven flush, as shown, into the interlock component 7, but may also be screwed in to slightly below flush (not shown).

The three-dimensional shape (height H, width B, depth T) of the interlock component 7 may be adapted to the installation space of the carrier and to the component 2 to be affixed. The height H may be between 2 mm and 20 mm. Additionally, the height of the interlock component 7 may be less than the length 19 of the threaded pin 4. The width B and depth T may be at least twice the diameter 11 of the threaded pin 4.

An interlock receiving space 8 may be provided within the part 3 to be affixed. The interlock receiving space 8 may include a recess in the part 3 to be affixed and may be shaped to correspond to the shape of the interlock component 7.

The threaded pin 5 screwed into the interlock component 7 may be inserted into the corresponding interlock receiving space 8. The connection of the part 3 to be affixed to the carrier 2 may be made by striking the interlock component 7 to press-fit the lower end of the threaded pin 4 to the carrier 2.

Figure 2:
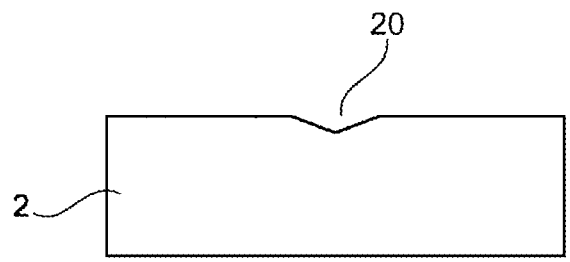
FIG. 2 shows a carrier according to an example embodiment of the present disclosure.

FIG. 2 shows a side view of a section through a foamed carrier 2. A notch 20 is provided in the foamed carrier 2 depicted in FIG. 2. The notch 20 may facilitate the positioning of drive screw 1 (e.g., as depicted in FIG. 1). The carrier 2 may have a degree of foaming between 3% and 80%. The carrier 2 may be formed of a closed-cell plastic, e.g., an elastic polypropylene. In embodiments where the density of the carrier 2 is largely constant, i.e., the surface does not form a shell, then a notch 20 may be used as a positioning aid. The drive screw 1 (e.g., as depicted in FIG. 1) may be screwed directly into the solid material of the carrier 2 by press-fitting or screwing accompanied by compression and displacement.

Figure 3:
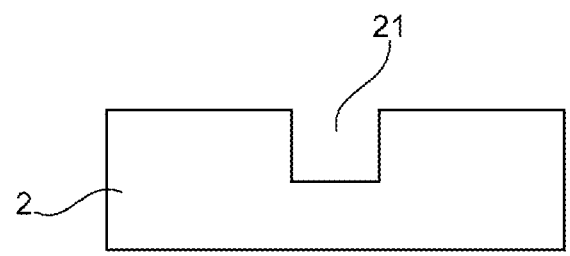
FIG. 3 shows a carrier according to another example embodiment of the present disclosure.

FIG. 3 shows a side view of a section through another carrier 2 according to another embodiment of the present disclosure. A boss 22 may be provided within the foamed carrier 2 depicted in FIG. 3. In embodiments where the carrier 2 is produced in a physical MuCell® or via any other foaming process, the marginal layers may form a closed outer shell. In embodiments where the carrier 2 is formed of MuCell® injection-molded parts, press-fitting without a boss 22 may result in the destruction of the compact outer layer. To prevent this destruction, a boss 22 may be introduced into the outer shell of the carrier 2, and the drive screw 1 (e.g., as depicted in FIG. 1) may be press-fitted through the boss.

Figure 4:
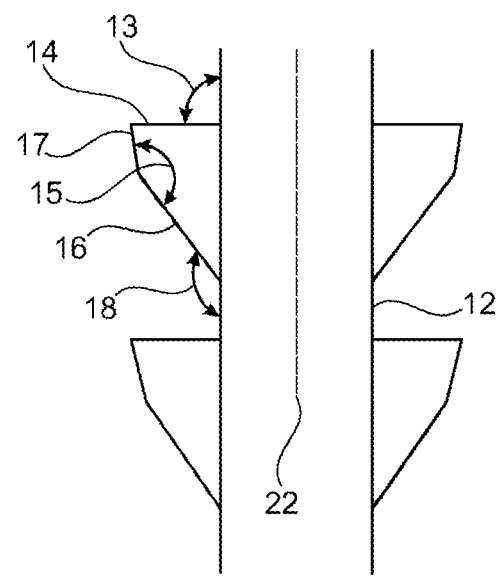
FIG. 4 shows a partial section of a threaded pin according to an example embodiment of the present disclosure.

FIG. 4 is a schematic view of a portion of the fastener of FIG. 1 wherein certain geometric characteristics of the thread portions are exaggerated for purpose of illustration. The thread 9 includes a first angle 13 between 45 and 90 degrees at a transition between the thread root 12 and the first flank 14. The thread 9 also includes a second angle 15 between 95 and 120 degrees at the junction between the second flank 17 and the third flank 16 along with a third angle 18 between 90 and 120 degrees at a transition between the third flank 16 and the thread root 12.

LIST OF REFERENCE NUMBERS

1 drive screw
2 carrier/support component
3 part to be affixed
4 threaded pin
5 first end
6 second end
7 interlock component
8 interlock receiving space
9 screw thread
10 thread spacing/pitch
11 outer diameter, threaded pin
12 thread root
13 first segment
14 first flank
15 second segment
16 second flank
17 junction
18 third segment
19 length of threaded pin
20 notch
21 boss
22 central screw axis
23 edges

What is claimed is:

1. A drive screw connecting a carrier formed of foamed material to a part to be affixed to the carrier and having an interlock receiving space, comprising:
   a threaded pin with a first end having shaped elements configured to connect to a tool that transfers torque and a second end configured to penetrate into the carrier,
   wherein the first end is surrounded by and connected to an interlock component corresponding to the interlock receiving space;
   wherein the threaded pin further has a screw thread for compressing the material of the carrier;
   wherein the screw thread has rounded edges at least in a portion of the screw;
   wherein the interlock component and the threaded pin are connected to the carrier by a linear press-fit and the connection is released by unscrewing the threaded pin; and
   wherein the screw thread includes a first angle between 45 and 90 degrees at a transition between a thread root and a first flank, a second angle between 95 and 120 degrees at the junction between a second flank and a third flank, along with a third angle between 90 and 120 degrees at a transition between the third flank and the thread root.

2. The drive screw according to claim 1, wherein:
   the carrier comprises a foamed plastic, and
   a pitch dimension of the threaded pin is adapted to correspond and optimize use with the degree of foaming of the carrier, and
   wherein the degree of foaming is within a ranging of 2% to 90%.

3. The drive screw according to claim 1, wherein a pitch of the threaded pin is greater than 0.7 mm.

4. The drive screw according to claim 1, wherein a ratio of a pitch of the screw thread to an outer diameter of the threaded pin is smaller than 2.

5. The drive screw according to claim 1, wherein the threaded pin has an outer diameter between 4 mm and 10 mm and a length between 9 mm and 100 mm.

6. The drive screw according to claim 1, wherein the carrier has a degree of foaming between 3% and 80% and has a notch as a positioning aid for the drive screw on a side facing the part to be affixed.

7. The drive screw according to claim 1, wherein the carrier has a degree of foaming between 8% and 80% and has a boss as a positioning aid.

8. The drive screw according to claim 1, wherein the interlock component is three-dimensional and has a height between 2 mm and 20 mm and a width that is at least twice a diameter of the threaded pin.

9. The drive screw according to claim 1, wherein at least one of the interlock component and the interlock receiving space comprise at least one of plastic, copper, aluminium, brass, steel, a natural material, and an alloy.

10. The drive screw according to claim 2, wherein the foamed plastic comprises an elastic polypropylene.

11. The drive screw according to claim 1, wherein the screw thread has the rounded edges at least at a distance from a tip of the drive screw.

12. The drive screw according to claim 3, wherein the pitch of the threaded pin is greater than 1 mm.

13. The drive screw according to claim 4, wherein the ratio of the pitch of the screw thread to the outer diameter of the threaded pin is smaller than 1.

14. The drive screw according to claim 1, wherein the interlock component and the threaded pin are made of the same material.

* * * * *